Oct. 19, 1965    R. W. GUNDLACH    3,212,417
REFLEX EXPOSURE SYSTEM
Filed Oct. 1, 1963    2 Sheets-Sheet 1

*INVENTOR.*
ROBERT W. GUNDLACH
BY
*ATTORNEY*

INVENTOR.
ROBERT W. GUNDLACH
ATTORNEY 3,212,417
REFLEX EXPOSURE SYSTEM
Robert W. Gundlach, Perinton, N.Y., assignor to Xerox Corporation, Rochester, N.Y., a corporation of New York
Filed Oct. 1, 1963, Ser. No. 313,019
15 Claims. (Cl. 95—1.7)

This invention relates to reflex exposure of a photosensitive recording member.

Photosensitive image reproducing systems commonly use expensive and bulky optical lens exposure systems for focusing a light pattern on the photosensitive surface. In making a size to size reproduction of a transparency, the optical lens is avoided by placing the transparency directly in contact with the photosensitive surface and shining light through the transparency. Unfortunately, the direct light system will not work when the original is opaque. Various reflex concepts have been tried involving illuminating through the photosensitive member. These either rely on the relatively greater illumination in areas where the original is reflective as opposed to areas where the original absorbs light. Alternatively, the reflex concepts may rely on half tone patterns of opaque dots or the like partially shielding the photosensitive material from direct illumination while permitting exposure by light reflected from the original. Still another concept to avoid the optical lens has been through the use of thin luminescent layers to introduce a light source between the original and the photosensitive member without displacing the two sufficiently to lose all resolution.

Despite a great deal of effort on alternative approaches, high quality photographic and xerographic copying devices today use some form of optical projection system for imposing a light pattern corresponding to the original onto the photosensitive member. Reflex systems have involved compromise in the structure and operation of the photosensitive member producing deterioration in the reproduced image. The present invention has the advantages of the reflex system and of the contact system without the disadvantages usually attendant on them. The usual reflex system uses light directed through the photosensitive member while the contact system uses light directed through the original to be copied. The present invention directs the light in between the original and the photosensitive member without requiring excessive separation between the two during exposure. Specifically, this is achieved by delivering a line of light in close proximity to the line of contact where an original and a photosensitive member are brought together in a continuously progressing line. Thus, it is an object of the invention to define a method of reflex exposure in a system for recording a light image.

A further object of the invention is to define means for introducing light to an image original positioned in closely spaced relation to a photosensitive member.

A still further object of the invention is image recording apparatus which avoids optical focusing of the image pattern.

Further objects and features of the invention will become apparent while reading the following description in connection with the drawings where:

Figure 1:
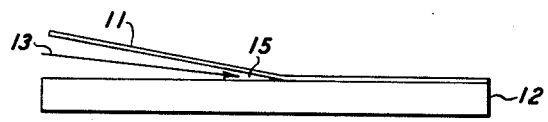
FIGURE 1 is a diagrammatic illustration showing the basic principles of the invention.

The basic theory of the invention is best explained by reference to FIG. 1. Image-bearing original 11 in FIG. 1 is illustrated as having been brought gradually in contact with sensitive xerographic plate 12. As original 11 is brought in contact with plate 12, a source of light represented by an arrow 13 directs a line of light at the original just in front of the advancing line of contact. In order to function properly, this light must be restricted to illumination in an extremely small line segment 15 immediately ahead of the contact point as the original and plate are brought into contact. In order to produce copies in which the resolution is not objectionably deteriorated to the naked eye the limitations are that in the illuminated line segment the spacing between the plate 12 and original 11 must not exceed about 2 mils. A spacing of 3 mils is permissible provided resolution requirements are not better than 4 line pairs per millimeter. With spacings greater than 3 mils, resolution becomes rapidly unacceptable for most applications. Whether the light strikes the original preferentially to the photosensitive plate is not critical provided the plate has a reflective surface. Vitreous selenium xerographic plates and most photographic gelatin base films are adequately reflective at grazing incidence for this purpose. Where less reflective photosensitive materials are involved, the light can be directed preferentially at the original using techniques that will be disclosed below.

In order to provide a light source in the desired limited area of illumination, it has been found preferable to use a light guide. While a highly focused light beam is operable it places such high physical tolerance limitations on the rest of the system including the original as to overcome its advantages. A light guide particularly adaptable to the present invention is a thin sheet or film of transparent material having surface polish adequate to provide a high degree of internal reflection.

The degree of internal reflection is limiting on the efficiency of the system, but of more importance is the transmission spectrum of the transparent material. It is essential that the material pass light to which the photosensitive member is sensitive. Glass is generally available with broad spectrum transmission of actinic light. Two types of glass that have been found suitable are "Microsheet Glass" available from Corning Glass Works, Corning, New York, and "Corning Ribbon Glass" available from the same source.

In order to selectively deliver the light only at a point where the photosensitive member and the original are 3 mils or less apart, the light guide must have a thickness at the delivery end of between about 1 to 4 mils. In this thickness range the glass specified above is quite flexible. However, despite flexibility, glass is still fragile and for long life, under conditions such as in the apparatus of FIG. 10 where the light guide is frequently flexed against the surface of the photosensitive member by surface irregularities of the original, a more malleable material may be desired. Examples of more malleable materials are polyester films such as "Cronar" available from E. I. du Pont de Nemours and Co., cellulose acetate, diacetate and triacetate films and the like. Some of these plastic resin films tend to absorb light in the blue-green region of the spectrum and when using them, it is desirable that the photosensitive member have a spectral response extending into the yellow and red. If the photosensitive member has limited spectral response or if it is desired to reproduce from originals with wide color variations, the light guide material should have water-white transparency such as in some glasses and acrylic plastics.

Figure 2:
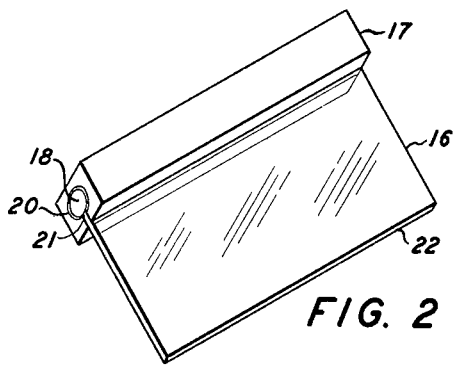
FIGURE 2 illustrates one embodiment of a light source device in accordance with the invention.

FIG. 2 illustrates one embodiment of a light source device in which a transparent sheet is supported in support housing 17 containing a linear light source such as fluorescent light tube 18. Reflective shield 20 directs the light into the adjacent edge 21 of transparent sheet 16. Due to internal reflection in transparent sheet 16, a substantial portion of the light directed into edge 21 is emitted at edge 22.

Figure 3:
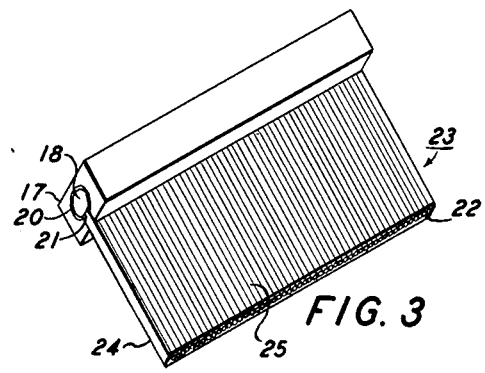
FIGURE 3 illustrates a second embodiment of a light source device.

While the materials discussed above have all been described as homogeneous transparent sheets, sheets of optical fibers may also be utilized. FIG. 3 illustrates an embodiment o fthe device of FIG. 2 in which transparent sheet 16 has been replaced with sheet 23 comprised of a single row of optical fibers 25 in transparent cladding film 24 of lower refractive index.

Figure 4:
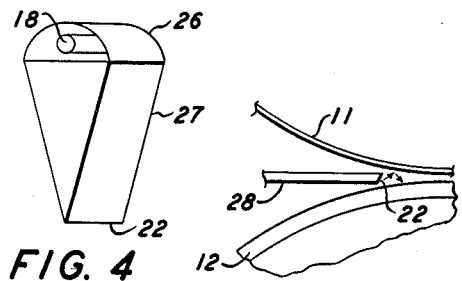
FIGURE 4 illustrates a third embodiment of a light source device.

In some instances, it is preferable to have a fairly rigid light guide device. For example, in the apparatus embodiment of FIG. 9, one surface of a rigid light guide serves as a support surface for the original being reproduced. Such a rigid device is shown in FIG. 4. In this device, reflective light shield 26 is fastened to a solid wedge shaped block 27 of a transparent plastic such as one of the acrylic plastics available under the trade names "Lucite" of E. I. du Pont de Nemours & Co. and "Plexiglas" of Rohm & Haas Co. A linear light source 18 positioned inside shield 26 directs light into the transparent blocks 27. It must be understood that the shape of block 27 is for structural rigidity and not for any particular optical characteristics. While the surfaces of block 27 must have the glossy characteristics necessary for internal reflection, the angle of the sides results in some of the light being reflected back up the block rather than driven to edge 22. This characteristic makes it necessary to provide mirror-like coatings on the four outside surfaces of the block so that light reflected back up the block will eventually be reflected down again rather than passing out through the sides. These mirror-like coatings are suitably provided by evaporating silver, aluminum or a similar reflective material on the four side surfaces.

Figure 6:
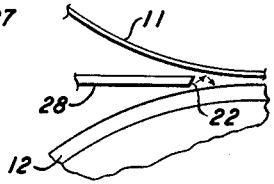
FIGURES 5, 6, 7 and 8 illustrate various embodiments and features of the operative edge of a light source device in accordance with the invention.
Figure 5:
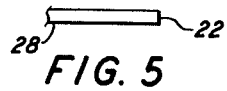

FIG. 5 represents an enlarged portion of a light guide 28 in accordance with any one of FIGS. 1–4. The light emitting edge 22 is cut square in this embodiment so that a great deal of the light will pass straight out the end. This is particularly suitable where the photosensitive member is highly reflective so that most light striking the photosensitive member at a low angle will be reflected up to the original being copied.

Where the photosensitive member has a poorly reflective surface such as is common in zinc oxide binder papers used in xerography, it has been found preferable to modify the light emitting edge of the light guide so as to direct the emitted light preferentially to the original being reproduced. FIG. 6 illustrates a portion of a light guide with edge 22 modified for this purpose in operating position to show the results effected. Thus, in FIG. 6, light emitting edge 22 is cut and polished at a slant with respect to the light guide 28 so that the difference in refractive index as the light passes from the light guide into the air space between original 11 and photosensitive member 12 will cause the light to be refracted in the direction of original 11. For this purpose, it is essential that emitting edge 22 have a glossy or polished surface so as to avoid diffusion of the light as it passes from the light guide to the air space.

Figure 7:
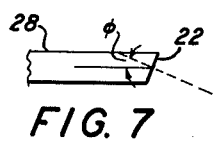

FIG. 7 shows an enlarged view of the portion of a light guide shown in FIG. 6 illustrating the critical features of the angle at which light emitting edge 22 is slanted. Depending upon the angle of this slanted edge with the light striking it from inside the light guide, more or less of the light will be reflected back inside the guide with a resulting effect on the system efficiency. In order to obtain light efficiency at a reasonable level, edge 22 should be designed so that light striking it in a direction parallel with the axis of the light guide will pass through to a greater extent than it will be reflected. This is achieved by maintaining the angle between a line normal to the surface of edge 22 and the line of incidence of light to edge 22 designated in FIG. 7 as angle $\phi$ less than the "critical angle" for the materials involved. The critical angle is that angle at which the incident light is refracted tangent to the surface. For example, a glass to air interface will usually have a critical angle of about 41 to 42°.

Figure 8:
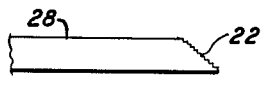

An alternative embodiment, the light emitting edge 22 is ground or cut off at a slant as shown in FIG. 8 to leave an abraded or slightly roughened surface. The function of this surface of edge 22 is to diffuse incident light in the direction of the original. The angle of the slant in this embodiment is made to direct edge 22 in a configuration facing the original to be copied. In the embodiment of FIG. 8 the slant is opposite that used for the embodiment of FIGS. 6 and 7 wherein the slant is determined by the characteristics of light refraction at a solid to gas interface. For light refraction in FIGURES 6 and 7, edge 22 faces in the direction of the photosensitive member to direct the refracted light toward the original being reproduced. With materials wherein it may be more expedient to first cut edge 22 with a smooth non-diffusing surface, the surface of edge 22 may be roughened by a separate step. The second step may comprise the frosting techniques used with glass and plastic or, where a readily softenable plastic is involved, by one of the techniques known a "blushing." "Blushing," for example, can be produced in a plastic by softening the plastic by a solvent or heat and then presenting the plastic to water vapor or mist. In this way the light striking emitting edge 22 is diffused generally in the direction of the original to be reproduced and reflected back to the photosensitive member in image configuration.

Figure 9:
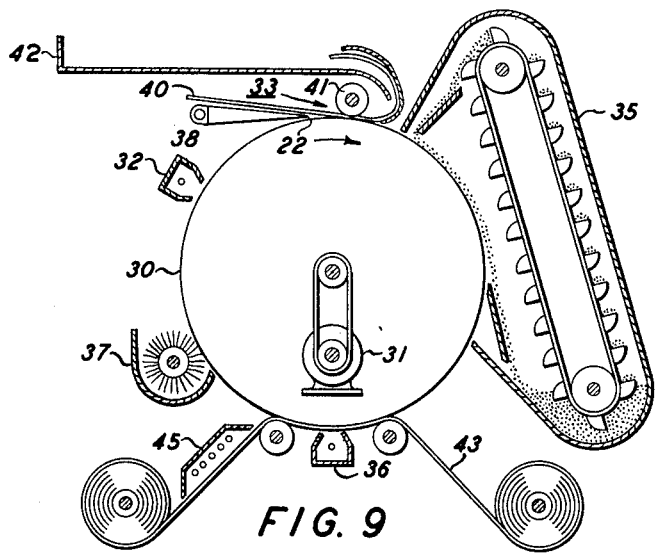
FIGURE 9 illustrates one embodiment of complete recording apparatus in accordance with the inventive concept.
Figure 10:
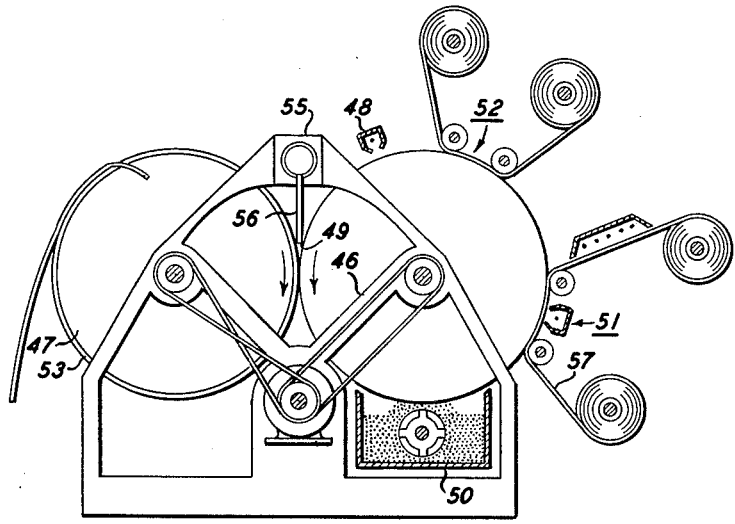
FIGURE 10 illustrates a second embodiment of complete recording apparatus.

With internally reflecting materials that are substantially transparent, contact of the exterior surface with other materials generally destroys the internal reflectivity causing light loss. In configurations of the present invention where such contact is likely to occur, such loss is avoided by coating the exterior surface of the light guide with a highly reflective material such as evaporated metal or the like. It is also possible to add additional strength and abrasive resistance, to that portion of the light guide for which thickness is not critical, by applying an evaporated metal coating and then a coating of a tough plastic over the evaporated metal. A light guide for reflex exposure in accordance with the invention is readily adaptable to an image recording system. Two examples of reproducing apparatus are illustrated in FIGS. 9 and 10. In FIG. 9, photosensitive reproducing member 30 is depicted as a xerographic drum. This drum is rotated by motor 31 sequentially past a sensitizing station 32 illustrated as a corona discharge device, an exposure station 33 in accordance with the present invention, a developing station 35 depicted as a cascade developing device, a transfer station 36 illustrated as using a corona device for electrostatic transfer, and a cleaning station 37 depicted as a brush cleaning device. The exposure station is shown as using light guide 38 in the configuration shown in FIG. 4. In operation, an original 40 is carried between the xerographic drum and a drive roller 41 in such a way that the original 40 is separated from the xerographic drum only by the thickness of light guide 38 as it passes over light emitting edge 22 of the light guide. The original 40 is then passed into receiving tray 42. The latent image pattern, now on the surface of the xerographic drum is developed at developing station 35 and then transferred to a transfer web 43 at transfer station 36. The transferred image on web 43 is fixed by fixing station 45 depicted as a heat fixing device. After transfer of the image, residual developer is removed from the xerographic drum at cleaning station 37 and the drum is then resensitized by corona charging at sensitizing station 32.

In FIG. 10, the reproducing apparatus is illustrated as using two drums. In this embodiment, a photosensitive drum 46 is rotated against a drum 47 adapted to carry an original to be reproduced. As in FIG. 9, the photosensitive drum is depicted here as a xerographic drum with a sensitizing station 48, an exposure station 49, a developing station 50, a transfer station 51 and a cleaning station 52 arranged around the drum in the given sequence. Original carrying drum 47 has a surface layer 53 of a compressible spongy material such as foam rubber or a soft foam plastic. The thickness of this layer is not critical but must be adapted to compensate for variations in the originals to be reproduced and generally should be in a range of 5 thousandths of an inch thick or more. Means for securing the original to drum 47 is depicted here as a tapered slot extending into the surface of the drum across the width of the drum. The taper of the tapered slot acts so as to pinch the entering edge of an original pushed into the slot. This type of an arrangement has the advantages of accepting varied thicknesses of originals and of leaving a relatively smooth drum surface at the point where the original is attached. Exposure station 49 is illustrated as using a light guide device 55 of the type illustrated in FIG. 2. In operation, drum 47 carries the original around so that the original actually comes in physical contact with light guide 56 just before contacting the photosensitive drum 46. The compressibility of spongy layer 53 prevents damage or excessive wear of the light guide. As in FIG. 9, the xerographic drum is charged at sensitizing station 48 before reaching the exposure station, developed after exposure at developing station 50 depicted in this embodiment as a magnetic brush developing device, transfers the image to transfer material 57 and is then cleaned of residual developer at cleaning station 52 depicted as web cleaning apparatus.

While the present invention has been described as carried out in specific embodiments thereof, there is no desire to be limited thereby, but it is intended to cover the invention broadly within the spirit and scope of the appended claims.

What is claimed is:

1. A method of recording by reflex exposure of a photosensitive member comprising:
   (a) contacting an image bearing original with a photosensitive member in a continuously progressing line of contact;
   (b) delivering a line of light through a closed path between said original and said member to a point in close proximity with said line of contact; and,
   (c) illuminating said original with said line of light to alter said member selectively in accordance with light reflected from said original.

2. A method of image reproduction comprising:
   (a) advancing an original to be reproduced into progressive line contact with a photosensitive member;
   (b) guiding light along a closed path to a point adjacent to said line contact whereat the maximum separation between said original and said member is three mils;
   (c) angularly directing said light toward said original so that it is selectively reflected upon said member to expose said member in accordance with said original; and,
   (d) developing said photosensitive member.

3. A method of image reproduction according to claim 2 in which said angularly directing is by refraction from a polish surface.

4. A method of image reproduction according to claim 2 in which said angularly directing is by diffusion from a rough surface.

5. A method of exposing a photosensitive member with the image pattern of an original comprising:
   (a) positioning a leading edge of said original in contact with said photosensitive member;
   (b) conducting light to a line segment of said original at a point where said original is within three mils distance of said photosensitive member; and,
   (c) continuously advancing the line of contact between said original and said member while progressively conducting light to the original immediately preceding said line of contact.

6. Exposure apparatus for a photosensitive recording system comprising:
   (a) means to advance an original into line-at-a-time contact with a photosensitive member;
   (b) a light source;
   (c) a supporting shield around said light source;
   (d) a flexible internally reflective light guide supported by said shield with a light receiving edge positioned to receive light from said light source; and
   (e) a light emitting edge for said light guide positioned adjacent to said line-at-a-time contact, having a thickness of about one to four mils, adapted to direct emitted light angularly with respect to the plane of said light guide and toward said original.

7. An exposure system according to claim 6 in which said light emitting edge has a polish surface cut at a slant with respect to the plane of said light guide so that emitted light is refracted by the transition from the solid guide to air.

8. An exposure system according to claim 6 in which said light emitting edge has a light diffusing surface cut at a slant with respect to the plane of said light guide so that emitted light is diffused generally in the direction normal to the slant.

9. An image recording device for recording an image pattern carried on the surface of sheet material onto an adjacent photosensitive member comprising:
   (a) means to support a photosensitive member;
   (b) means to advance an image bearing original into progressive line-at-a-time contact with said photosensitive member;
   (c) means to provide illumination to said original in a restricted area immediately in advance of contact; wherein said original is spaced within three mils of said photosensitive member; and,
   (d) means to develop said photosensitive member.

10. An image recording device according to claim 9 in which said means to provide illumination is an internally reflective sheet having a light receiving edge and a light emitting edge, said light emitting edge having a thickness of about 1 to 4 mils adapted to deliver a concentrated line of light into a space as narrow as three mils in the direction perpendicular to the plane of said sheet.

11. An image recording device according to claim 9 in which said means to provide illumination is a sheet of fiber optics.

12. In apparatus for recording an image pattern by reflex exposure to a photosensitive member including means to transport an image bearing original into contact with said member, a reflex exposure station, a developing station, and a printing station, the sub-combination in said exposure station comprising:
   (a) a light source; and
   (b) a light pipe 1 to 4 mils thick adapted to conduct a line of light to said original in a restricted area adjacent to the position of contact with said member wherein the spacing between said original and said member is within three mils.

13. Exposure apparatus for a photosensitive recording system comprising:
 (a) means to support an original image for contact with a photosensitive member;
 (b) means to advance said original into line-at-a-time contact with said member;
 (c) a light source;
 (d) an internally reflective light guide for conducting light from said source through a closed path to said original;
 (e) a light receiving edge of said guide positioned to receive light from said source;
 (f) a light emitting edge of said guide positioned between said means to support and said photosensitive member adapted to illuminate said original image along a line that is a maximum distance of three mils from said member in order to selectively reflect light from said original image to expose said member.

14. An image recording device for recording an image pattern on a photosensitive layer comprising:
 (a) rotatable drum means for supporting a photosensitive layer;
 (b) support means for carrying an image pattern-bearing member into progressive line-at-a-time contact with said photosensitive layer;
 (c) a light source;
 (d) an internally reflective light pipe for carrying light from said light source said member;
 (e) means to support said light pipe between said member and said layer so that it illuminates a line segment of said member and reflects to selectively expose said layer at a position where the maximum distance between said member and said layer is three mils;
 (f) means to advance said drum and said support means synchronously so that new line segments of said members are progressively illuminated and reflect light selectively to expose progressive segments of said layer; and
 (g) means to develop the image formed by selectively exposing said layer.

15. Xerographic apparatus comprising in combination:
 (a) rotatable drum means to support a photoconductive insulating layer;
 (b) cylinder means positioned in contact with said drum and adapted to rotatably support an image original in contact with said drum;
 (c) a sensitizing station for sensitizing said photoconductive insulating layer with a uniform electrostatic charge;
 (d) a reflex exposure station for selectively dissipating said charge in accordance with an original supported on said cylinder comprising:
  (1) a light source;
  (2) a flexible internally-reflective light-conducting sheet positioned to receive light from said light source along a first edge and emit said light along a second edge; and
  (3) means to support said light conducting sheet with said second edge immediately adjacent to the point of contact between said cylinder and said drum;
 (e) a developing station for developing a latent pattern of selectively dissipated electrostatic charge on said photoconductive insulating layer;
 (f) a transfer station for transferring images developed in said developing station from said photoconductive insulating layer to copy sheets;
 (g) a cleaning station for cleaning residual developer from said photoconductive insulating layer; and,
 (h) means to synchronously rotate said drum and said cylinder with said drum passing sequentially through said sensitizing, exposure, developing, transfer and cleaning stations.

References Cited by the Examiner

UNITED STATES PATENTS

| | | | |
|---|---|---|---|
| 2,909,971 | 10/59 | Barber | 95—1.7 |
| 2,946,682 | 7/60 | Lauriello | 96—1 |
| 2,947,625 | 8/60 | Bertelsen | 96—1 |
| 2,968,553 | 1/61 | Gundlach | 96—1 |
| 2,976,447 | 3/61 | McNaney | 313—108 |
| 2,984,163 | 5/61 | Giaimo | 96—1.7 |
| 3,007,049 | 10/61 | McNaney | 250—260 |
| 3,062,110 | 11/62 | Shepardson et al. | 95—1.7 |

EVON C. BLUNK, *Primary Examiner.*

N. G. TORDRIN, *Examiner.*